United States Patent
Finch

[15] 3,678,092
[45] July 18, 1972

[54] 3-HYDROXYCYCLOPENTYL-ALKANOIC ACIDS

[72] Inventor: Neville Finch, West Orange, N.J.

[73] Assignee: Ciba-Geigy Corporation, Summit, N.J.

[22] Filed: Feb. 24, 1969

[21] Appl. No.: 801,797

[52] U.S. Cl. ............260/468 R, 260/268 R, 260/345.8, 260/347.3, 260/347.4, 260/483, 260/501.1, 260/514 R, 424/305, 424/316, 424/317
[51] Int. Cl. .............................................C07c 61/32
[58] Field of Search .........................260/468, 514

[56] References Cited

FOREIGN PATENTS OR APPLICATIONS 6,612,693  3/1967  Netherlands.............................260/468

OTHER PUBLICATIONS

Struizk et al., Rec. Trav. Chim. 85, 1233 (1965)

*Primary Examiner*—Lorraine A. Weinberger
*Assistant Examiner*—Robert Gerstl
*Attorney*—Harry Goldsmith, Joseph G. Kolodny, Bryant W. Brennan and Edward J. Sites

[57] ABSTRACT

$2\beta$-Hydroxyalkenyl-$3\beta$-hydroxycyclopentyl-alkanoic acids, e.g. such as those of the formula

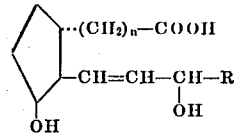

R = aliphatic, cycloaliphatic, araliphatic or aromatic radical
n = 5-7 and functional derivatives thereof are hypotensives.

4 Claims, No Drawings

3-HYDROXYCYCLOPENTYL-ALKANOIC ACIDS

SUMMARY OF THE INVENTION

The present invention concerns and has for its object the provision of 2β-hydroxyalkenyl-3β-hydroxycyclopentyl-alkanoic acids of the Formula I

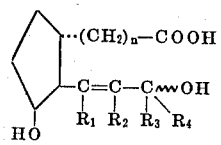

wherein each of $R_1$, $R_2$ and $R_3$ is hydrogen or methyl, $R_4$ is alkyl with 3 to 7 carbon atoms, benzyl or phenyl, and $n$ is an integer from 5 to 7, of the functional acid derivatives thereof, as well as of corresponding pharmaceutical compositions and of methods for the preparation and application of these products. Said compositions are useful hypotensive and antihypertensive agents in the treatment or management of essential hypertension or vasospastic conditions.

DESCRIPTION OF THE PREFERRED EMBODIMENT

The lower alkyl radicals $R_4$ represent, for example, methyl, ethyl, n- or i-propyl, -butyl, -pentyl, -hexyl or -heptyl. The term "lower", referred to above and hereinafter in connection with organic radicals or compounds respectively, defines such with up to 7, preferably up to 4, carbon atoms.

Functional derivatives of the acids of Formula I are preferably their esters, for example, their lower alkyl, esters, or preferably their salts, for example, the ammonium salts derived from ammonia or therapeutically useful amines, e.g., mono-, di- or triethylamine, ethylenediamine, cyclohexylamine or piperazine, alkali or alkaline earth metal, e.g., sodium, potassium, magnesium or calcium salts.

The compounds of the invention possess valuable pharmacological properties. For example, they exhibit hypotensive effects, as can be demonstrated in animal tests, using advantageously mammals, such as dogs, as test objects. The compounds of the invention may be applied in the form of aqueous solutions or suspensions intraveneously or injected into the lumen of the small intestine of anesthetized, normotensive dogs, or applied in the form of gelatin capsules orally to unanesthetized normotensive or renal hypertensive dogs, in a dosage range between about 0.5 and 25 mg/kg/day, preferably about 0.5–10 mg/kg/day i.v. or about 5–25 mg/kg/day orally. The unanesthetized dogs may receive these doses for several weeks, and their blood pressure is registered by insertion of a needle into the femoral artery, which needle is connected with a transducer and a kymograph. In the anesthetized dog a catheter is inserted into the femoral artery and a cannula into the trachea, and the blood pressure is analogously recorded for about four to six hours, during which time the drug is applied. Simultaneously or independently, the cardiac output, coronary, femoral, renal and/or mesenteric blood flow may be recorded, by placing the probe of an electromagnetic flow meter around the artery under investigation, which probe also may be connected to a kymograph via an amplifier. Accordingly, the compounds of the invention are useful hypotensive and anti-hypertensive agents, for example, in the treatment or management of essential hypertension or vasospastic conditions. They are also useful intermediates in the preparation of other valuable products, preferably of pharmacologically active compounds.

Particularly useful are those compounds of Formula I, in which each of $R_1$, $R_2$ and $R_3$ is hydrogen or methyl, $R_4$ is alkyl with 3 to 7 carbon atoms, benzyl or phenyl, and $n$ is an integer from 5 to 7, or the ammonium, alkali or alkaline earth metal salts thereof.

Especially valuable are those compounds of Formula I, in which each of $R_1$, $R_2$ and $R_3$ is hydrogen, $R_4$ is n-butyl, -pentyl or -hexyl, and $n$ is the integer 6, particularly the 7[2β-(3ζ-hydroxy-1-octenyl)-3β-hydroxy-1α-cyclopentyl]-heptanoic acid, or the ammonium alkali or alkaline earth metal salts thereof, which, when applied at i.v. doses of about 0.5–10 mg/kg/day to anesthetized normotensive dogs, show outstanding and, relative to the prostaglandins, long-lasting hypotensive effects.

The compounds of this invention are prepared according to methods known per se. For example, they are obtained by reduction of the corresponding ketones of the Formula III

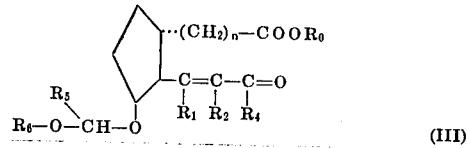

wherein $R_0$ is one metal equivalent or $R_4$, $R_5$ is hydrogen or each of $R_5$ and $R_6$ is an aliphatic, cycloaliphatic, araliphatic or aromatic radical or $R_5$ and $R_6$, when taken together, represent lower alkylene forming a 5 to 7 membered ring, e.g., 1,4-butylene, 1,4- or 1,5-pentylene, 1,4- or 2,5-hexylene or 2,5-heptylene and, if desired, converting any resulting compound into another compound of the invention.

Said reduction is advantageously performed with the use of simple or complex light metal hydrides, such as alkali metal boron or aluminum hydrides, e.g., sodium boron hydride or lithium tritertiary butoxy-aluminum hydride, or organo-metallic compounds, e.g., lithium or Grignard compounds, whereby, in case $R_4$ of Formula III represents lower alkyl, the other groups mentioned for $R_4$ can be introduced. Said ketones can also be reduced according to Meerwein-Ponndorf-Verley, for example, with the use of an aluminum lower alkoxide, e.g., the isopropoxide, and an alcohol, advantageously a lower alkanol, e.g. isopropanol.

The compounds of the invention so obtained can be converted into each other according to methods known per se. For example, resulting acetals or esters can be hydrolyzed, the former advantageously with acidic hydrolyzing agents, such as aqueous mineral acids, and the latter advantageously with alkaline hydrolyzing agents, such as aqueous alkali metal hydroxides or carbonates. Resulting esters may also be transesterified in the presence of acidic or alkaline agents, e.g., mineral or complex heavy metal acids or alkali metal carbonates or alcoholates. Resulting acids can be esterified, for example, with the use of the corresponding alcohols in the presence of a strong acid, e.g., hydrochloric, sulfuric, benzene or p-toluene sulfonic acid, or with diazo com-pounds, or salified with, for example, ammonia, amines, alkali or alkaline earth metal hydroxides or carbonates These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example, by separation of diastereomeric esters or salts thereof, e.g., by the fractional crystallization of the d-camphorsulfonates, d-α-(phenyl or 1-naphthyl)-ethylamine or l-cinchonidine salts.

The above reactions are carried out according to standard methods, in the presence or absence of diluents, preferably such as are inert to the reagents and are solvents thereof, of catalysts, condensing or neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used can be prepared according to the following formula scheme:

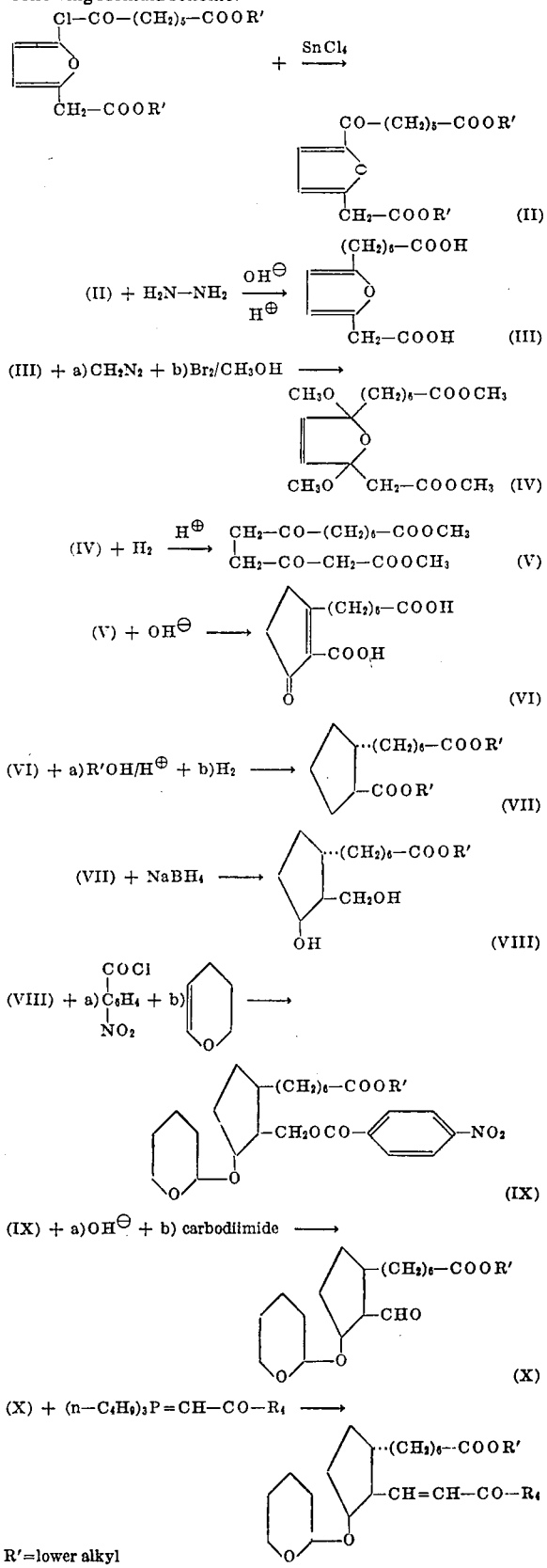

R'=lower alkyl

The pharmaceutically active compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g., lactose, glucose or sucrose, starches, e.g., corn starch or arrowroot, stearic acid or salts thereof, e.g., magnesium or calcium stearate, talc, vegetable fats or oils, gums, alginic acid, benzyl alcohols, glycols, and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75 percent, more particularly 1 to 50 percent, of the active ingredient. They are also included within the scope of the present invention.

The following examples are intended to illustrate the invention and are not to be construed as being limitations thereon. Temperatures are given in degrees Centigrade, and all parts wherever given are parts by weight.

EXAMPLE 1

To the solution of 2.75 g 7-[2β-(3-oxo-1-octenyl)-3β-(2-tetrahydropyranyloxy)-1α-cyclopentyl]-heptanoic methyl ester in 150 ml 95 percent aqueous ethanol, 5.5 g sodium borohydride are added while stirring at room temperature. After 30 minutes cold water is added and the mixture extracted with diethyl ether. The extract is washed two times with 100 ml cold water each, dried and evaporated. The residue is chromatographed on 75 g silica gel and eluted with a solution consisting of 15 percent ethyl acetate and 85 percent methylene chloride, to yield the 7-[2β-(3ζ-hydroxy-1-octenyl)-3β-(2-tetrahydropyranyloxy-1α-cyclopentyl]-heptanoic acid methyl ester of the formula

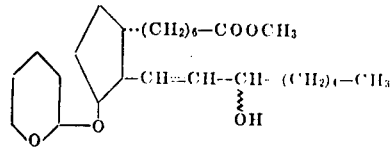

showing I. R. bands at 3440, 1733 and 1017 cm⁻¹.

EXAMPLE 2

To the solution of 2.05 g 7-[2β-(3ζ-hydroxy-1-octenyl)-3β-(2-tetrahydropyranyloxy-1α-cyclopentyl]-heptanoic acid methyl ester in 125 ml methanol, 3 ml N-hydrochloric acid are added while stirring at room temperature. After 2 ½ hours, the mixture is diluted with water and extracted with diethyl ether. The extract is washed three times with 100 ml water each, dried and evaporated. The residue is chromatographed on 60 g silica gel and eluted with a solution consisting of 20 percent ethyl acetate and 80 percent methylene chloride, to yield a fast-moving fraction consisting of the 7-[2β-(3α-hydroxy-1-octenyl)-3β-hydroxy-1α-cyclopentyl]-heptanoic acid methyl ester of the formula

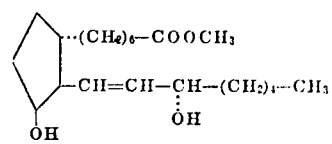

showing I. R.-bands at 3380 and 1738 cm⁻¹.

With a solution consisting of 40 percent ethyl acetate and 60 percent methylene chloride a slower-moving fraction is eluted, consisting of the 7-[2β-(3β-hydroxy-1-octenyl)-3β-hydroxy-1α-cyclopentyl]-heptanoic acid methyl ester of the formula

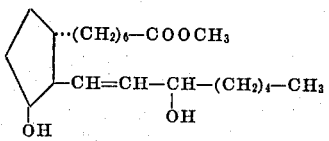

showing I. R.-bands at 3370 and 1740 cm⁻¹.

EXAMPLE 3

The mixture of 0.515 g 7-[2β-(3β-hydroxy-1-octenyl)-3β-hydroxy-1α-cyclopentyl]-heptanoic acid methyl ester, 120 ml methanol-10 percent aqueous potassium carbonate (1:1) is refluxed for 1 ½ hours and cooled to room temperature. It is diluted with water and washed with diethyl ether. The aqueous layer is cooled in an ice-bath to about 10° and acidified with 2N hydrochloric acid. The mixture is extracted with diethyl ether, the extract dried, evaporated and the residue recrystallized from diethyl ether-hexane, to yield the 7-[2β-(3β-hydroxy-1-octenyl)-3β-hydroxy-1α-cyclopentyl]-heptanoic acid of the formula

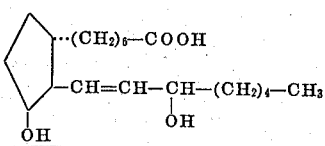

melting at 70-71.5°.

0.5 g of the 7-[2β-(3α-hydroxy-1-octenyl)-3β-hydroxy-1α-cyclopentyl]-heptanoic acid methyl ester are hydrolyzed as above, to yield the 7-[2β-(3α-hydroxy-1-octenyl)-3β-hydroxy-1α-cyclo-pentyl]-heptanoic acid of the formula

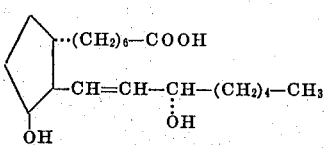

having an Rf = 6.5 with silica gel as the stationary phase and chloroform:methanol:water:acetic acid (90.3:8:0.7:1) as the moving phase. The above crystalline 3β-epimer has Rf = 6.0 in said system.

EXAMPLE 4

The starting material used in Example 1 can be prepared as follows:

55.83 g pimelic acid ethyl ester chloride are dissolved in 300 ml methylene chloride which has been passed through alumina (activity I, neutral). To the solution 47 ml stannic chloride are added dropwise while stirring and keeping the temperature below 3°. Hereupon, the solution of 34.1 g methyl 2-furyl-acetate in 200 ml methylene chloride are added slowly, while keeping the temperature below 3°. After completed addition, the reaction mixture is stirred for ½ hour, then ice and water are added while continuing stirring for an additional ½ hour. The organic layer is separated, washed with 10 percent aqueous potassium bicarbonate, dried, evaporated, the residue distilled and the fraction boiling at 162°/0.1 mm Hg collected. It represents the methyl 4-(6-ethoxy-carbonyl-hexanoyl)-furyl-(2)-acetate.

The solution of 1.0 g thereof, 2.6 g sodium hydroxide and 1.5 ml hydrazine hydrate in 30 ml glycol is heated for one hour to 240°-260°. Hereupon, another 1.5 ml hydrazine hydrate are added and the mixture is kept at 170° for three hours. It is then evaporated in high vacuum, the residue dissolved in water, the solution filtered, and the filtrate acidified with diluted hydrochloric acid to about pH 4. It is then cooled in ice, the precipitate filtered off and recrystallized from methanol to yield the 4-(6-carboxy-hexyl)-furyl-(2)-acetic acid, melting at 101°-103°.

6.19 g thereof are slurried in 100 ml diethyl ether and the solution combined with 210 ml of a 0.28 molar solution of diazomethane in diethyl ether. The mixture is stirred at room temperature for ½ hour and the excess diazomethane is removed with a few drops of acetic acid. The solution is washed with 10 percent aqueous potassium bicarbonate, dried, evaporated in vacuo, the residue distilled, and the fraction boiling at 142°-144° per 0.25 mm Hg collected; it represents the corresponding dimethyl ester.

12.35 g thereof are dissolved in 100 ml methanol, the solution cooled and 13.0 g sodium carbonate are added. To the stirred mixture the solution of 2.4 ml bromine in 24 ml methanol is added dropwise, while keeping the temperature below 0°. After completed addition the mixture is filtered, and to the filtrate 2.55 g 5 percent palladium on calcium carbonate are added. It is then hydrogenated and after an uptake of about one liter hydrogen, the mixture is filtered, the filtrate evaporated in vacuo, the residue dissolved in water and the solution acidified with diluted hydrochloric acid. After saturation with sodium chloride, it is extracted with diethyl ether, the extract dried and evaporated. The residue is recrystallized from diethyl ether to yield the 3,6-dioxo-tridicanedioic acid dimethyl ester, melting at 38°-39°.

24.84 g thereof are dissolved in 120 ml methanol and 250 ml of 20 percent aqueous potassium carbonate solution are added. The mixture is refluxed for one hour, evaporated in vacuo, and the residue acidified with diluted hydrochloric acid. The precipitate formed is filtered off and recrystallized from diethyl ether to yield the 2-(6-carboxyhexyl)-5-oxo-1-cyclopentenecarboxylic acid of the formula

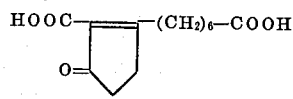

melting at 60°-62°.

Through the solution of 24.5 g thereof in 250 ml anhydrous methanol, dry hydrogen chloride is bubbled through for one hour at 4° and the solution stirred overnight while allowing to reach room temperature. It is evaporated in vacuo, the residue dissolved in diethyl ether and the solution washed three times with water and two times with 10 percent aqueous potassium bicarbonate, dried and evaporated. The residue is distilled and the fraction boiling at 185°-189°/0.15 mm Hg collected, to yield the methyl 2-(6-carbo-methoxy-hexyl)-5-oxo-1-cyclopentene-carboxylate.

To the solution of 6.3 g thereof in 200 ml anhydrous methanol 0.63 g platinum oxide are added and the mixture hydrogenated at atmospheric pressure. After about two hours the hydrogen absorption has ceased, the mixture is filtered and the catalyst washed well with methanol. The filtrate is evaporated, to yield the 7-(2β-carbomethoxy-3-oxo-1α-cyclopentyl)-heptanoic acid methyl ester showing I. R.-bands at 1720, 1760, 1260 and 1203 cm⁻¹.

To the stirred solution of 5.6 g thereof in 90 ml anhydrous methanol, cooled to about 18°, 2.8 g sodium borohydride are added in several portions. After stirring for five hours, the mixture is diluted with water and extracted with diethyl ether. The extract is washed with water, dried and evaporated. The residue is chromatographed on 75 g silica gel and eluted with a solution consisting of 80 percent ethyl acetate and 20 percent methylene chloride, to yield the 7-(2β-hydroxymethyl-3β-hydroxy-1α-cyclopentyl)-heptanoic acid methyl ester, showing I. R.-bands at 3390 and 1738 cm⁻¹.

To the stirred solution of 4.87 g thereof in 125 ml dry pyridine, the solution of 4.0 g 4-nitrobenzoyl chloride in 25 ml dry pyridine is added dropwise during 30 minutes at room temperature. After stirring for 16 hours at room temperature the mixture is evaporated in vacuo, the residue shaken up in water and extracted with diethyl ether. The extract is washed two times with water and 10 percent aqueous potassium bicarbonate each and evaporated. The residue is chromatographed over 240 g silica gel and eluted with a solution consisting of 15 percent ethyl acetate and 85 percent methylene chloride, to yield the 7-[2β-(4-nitrobenzoyloxymethyl)-3β-hydroxy-1α-cyclopentyl]-heptanoic acid methyl ester, showing I. R.-bands at 3490, 1610, 1539 and 720 cm⁻¹.

The mixture of 5.2 g thereof, 200 ml methylene chloride, 5.2 g dihydropyran and a few crystals of picric acid is stirred at room temperature for 18 hours. It is evaporated in vacuo, the residue dissolved in diethyl ether and the solution washed three times with water and 10 percent aqueous potassium bicarbonate each, dried and evaporated. The residue is chromatographed on 210 g silica gel and eluted with a solution consisting of 5 percent ethyl acetate and 95 percent methylene chloride, to yield the 7-[2β-(4-nitrobenzoyloxmmethyl)-3β-(2-tetrahydropyranyloxy)-1α-cyclopentyl]-heptanoic acid methyl ester, showing I. R.-bands at 1735, 1723, 1612, 1278 and 720 cm⁻¹.

The solution of 6.1 g thereof in 300 ml methanol is added to 90 ml 10 percent aqueous potassium carbonate while stirring at room temperature. After 40 minutes the solution is diluted with water and extracted with diethyl ether. The extract is washed three times with water, dried and evaporated. The residue is chromatographed over 120 g silica gel and eluted with a solution consisting of 20 percent ethyl acetate and 80 percent methylene chloride, to yield the 7-[2β-hydroxymethyl-3β-(2-tetrahydropyranyloxy)-1α-cyclo-pentyl]-heptanoic acid methyl ester, showing I. R.-bands at 3450, 1735 and 1025 cm⁻¹.

To the solution of 3.0 g thereof in 60 ml benzene and 60 ml dimethyl sulfoxide, 1.1 ml pyridine, 0.8 ml trifluoroacetic acid and 17.5 g 1-cyclohexyl-3-(2-morpholinoethyl)-carbodiimide metho-p-toluenesulfonate are added in this order while stirring at 4°. The resulting mixture is stirred at this temperature for five days, then diluted with cold water and extracted with diethyl ether. The extract is washed with cold water, dried and evaporated, to yield the 7-[2β-formyl-3β-(2-tetrahydropyranyloxy)-1α-cyclo-pentyl]-heptanoic acid methyl ester, showing broad I. R.-bands at 1710–1740 and 1020–1030 cm⁻¹.

To the solution of 3.0 g thereof in 100 ml diethyl ether, 3.25 g of the tri-n-butylphosphorane (obtained from equivalent amounts of 1-chloro-2-heptanone and tri-n-butylphosphine in refluxing chloroform, treatment of the resulting phosphonium compound with 2N-aqueous sodium hydroxide, distillation and collection of the fraction boiling at 144–146/0.02 mm Hg) are added while stirring and the mixture is refluxed for three days. It is evaporated in vacuo, the residue chromatographed on 200 g silica gel and eluted with the solution consisting of 15 percent ethyl acetate and 85 percent methylene chloride, to yield the 7-[2β-(3-oxo-1-octenyl)-3β-(2-tetrahydro-pyranyloxy)-1α-cyclopentyl]-heptanoic acid methyl ester, showing I.R.-bands at 1738, 1675, 1630 and 1027 cm⁻¹. Analogously, the tri-n-butylphosphorane, obtained with phenacyl bromide, can be used; it boils at 198°–201°/0.07 mm Hg.

EXAMPLE 5

Preparation of 10,000 tablets, each containing 50.0 mg of the active ingredient:

Formula:

| | |
|---|---|
| 7-[2β-(3α-hydroxy-1-octenyl)-3β-hydroxy-1α-cyclopentyl]-heptanoic acid | 500.00 g |
| Lactose | 1,706.00 g |
| Corn starch | 90.00 g |
| Polyethylene glycol 6,000 | 90.00 g |
| Talcum posder | 90.00 g |
| Magnesium stearate | 24.00 g |
| Purified water | q.s. |

Procedure:

All the powders are passed through a screen with openings of 0.6 mm. Then the drug substance, lactose, talcum, magnesium stearate and half of the starch are mixed in a suitable mixer. The outer half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

I claim:

1. The 2β-hydroxyalkenyl-3β-hydroxy-cyclopentyl-alkanoic acid of the formula

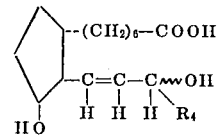

wherein R₄ is n-butyl, n-pentyl or n-hexyl, or the methyl esters, the ammonium, alkali or alkaline earth metal salts thereof.

2. A compound as claimed in claim 1, and being the 7-[2β-(3ζ-hydroxy-1-octenyl)-3β-hydroxy-1α-cyclopentyl]-heptanoic acid, or the ammonium, alkali or alkaline earth metal salts thereof.

3. A compound as claimed in claim 1 and being the 7-[2β-(3β-hydroxy-1-octenyl)-3β-hydroxy-1α-cyclopentyl]-heptanoic acid or its methyl ester.

4. A compound as claimed in claim 1 and being the 7-[2β-(3α-hydroxy-1-octenyl)-3β-hydroxy-1α-cyclopentyl]-heptanoic acid or its methyl ester.

* * * * *